United States Patent
Kobayashi et al.

(10) Patent No.: US 12,241,591 B2
(45) Date of Patent: Mar. 4, 2025

(54) HIGH-PRESSURE TANK AND MANUFACTURING METHOD OF THE SAME

(71) Applicant: TOYOTA JIDOSHA KABUSHIKI KAISHA, Toyota (JP)

(72) Inventors: Takuya Kobayashi, Toyota (JP); Koji Katano, Toyota (JP); Takeshi Ishikawa, Toyokawa (JP); Daisuke Satoya, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 17/934,444

(22) Filed: Sep. 22, 2022

(65) Prior Publication Data

US 2023/0119246 A1 Apr. 20, 2023

(30) Foreign Application Priority Data

Oct. 18, 2021 (JP) .................... 2021-170107

(51) Int. Cl.
*F17C 1/06* (2006.01)

(52) U.S. Cl.
CPC ........ *F17C 1/06* (2013.01); *F17C 2201/0109* (2013.01); *F17C 2203/012* (2013.01); *F17C 2203/0604* (2013.01); *F17C 2203/0621* (2013.01); *F17C 2203/066* (2013.01); *F17C 2209/2163* (2013.01); *F17C 2209/232* (2013.01); *F17C 2221/012* (2013.01); *F17C 2221/033* (2013.01); *F17C 2221/035* (2013.01);

(Continued)

(58) Field of Classification Search
CPC ................. F17C 2203/012; F17C 1/06; F17C 2201/0109; F17C 2203/0621
See application file for complete search history.

(56) References Cited

U.S. PATENT DOCUMENTS 5,758,796 A * 6/1998 Nishimura ................ F17C 1/06
220/651
2020/0309320 A1 10/2020 Ueda
2021/0213689 A1 7/2021 Maeda et al.
(Continued)

FOREIGN PATENT DOCUMENTS

JP H11-82888 A 3/1999
JP 2011163354 A * 8/2011
(Continued)

*Primary Examiner* — Stephen J Castellano
(74) *Attorney, Agent, or Firm* — Hunton Andrews Kurth LLP

(57) ABSTRACT

A high-pressure tank includes a liner that includes a body that is cylindrical in shape and a pair of dome portions each of which is provided at a respective end of the body in an axial direction, and a reinforcing layer provided on an outer circumferential face of the liner. The reinforcing layer includes a pair of resin rings each of which is provided encircling a respective end portion of an outer circumferential face of the body, a hoop layer that covers part of the outer circumferential face of the body, between the resin rings, and a helical layer that covers the resin rings, the hoop layer, and the dome portions. The resin rings are configured to cover part of the body from boundary portions between the body and the dome portions, and increase in thickness from the boundary portions toward a middle of the body.

5 Claims, 3 Drawing Sheets

(52) U.S. Cl.
CPC .................. *F17C 2223/035* (2013.01); *F17C 2270/0184* (2013.01)

(56) References Cited

U.S. PATENT DOCUMENTS

2021/0310615 A1* 10/2021 Iwase ..................... F17C 1/00
2022/0196206 A1* 6/2022 Furuzawa ................ F17C 1/06

FOREIGN PATENT DOCUMENTS

| JP | 2012149739 A | 8/2012 |
| JP | 2014133304 A | 7/2014 |
| JP | 2020169656 A | 10/2020 |
| JP | 2021110367 A | 8/2021 |

\* cited by examiner

FIG. 4A
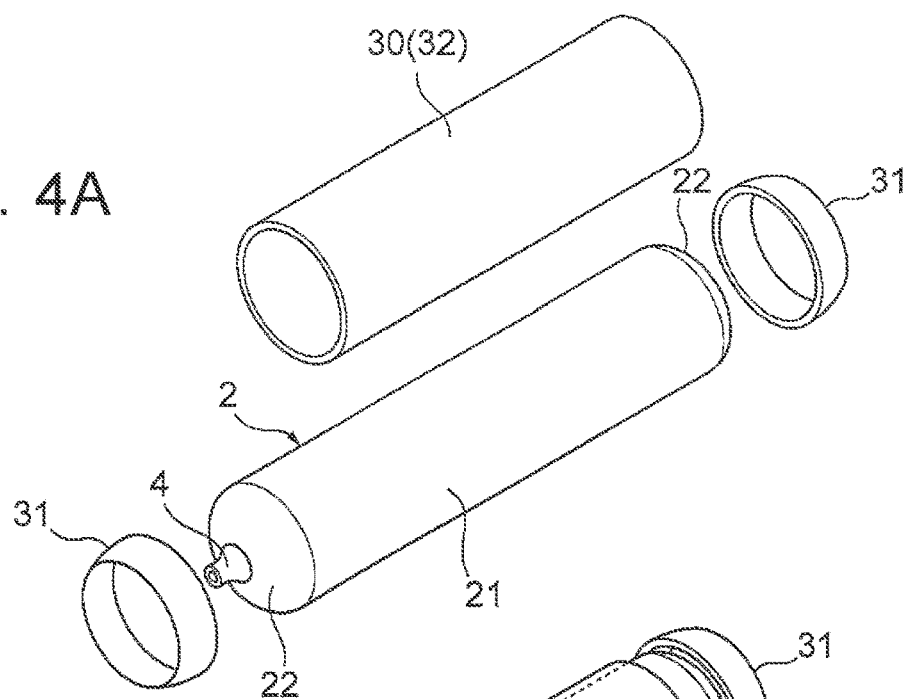
FIG. 4B
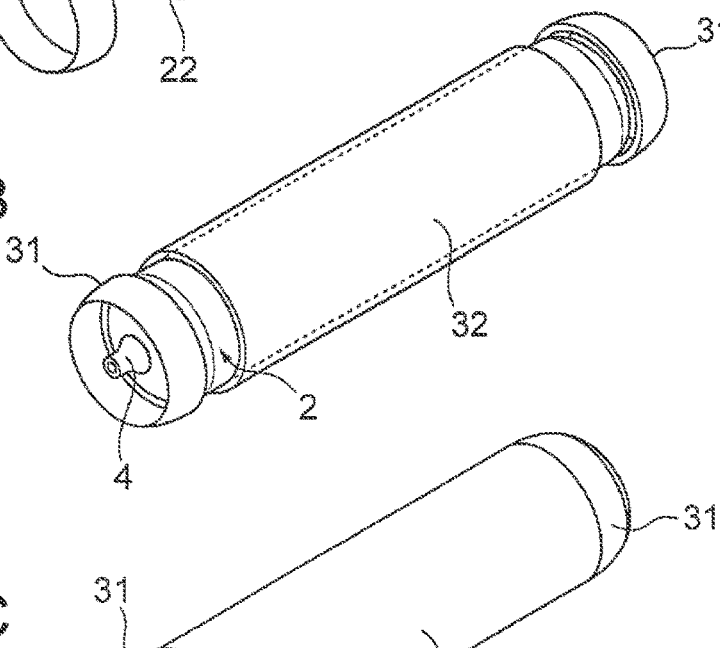
FIG. 4C
FIG. 4D
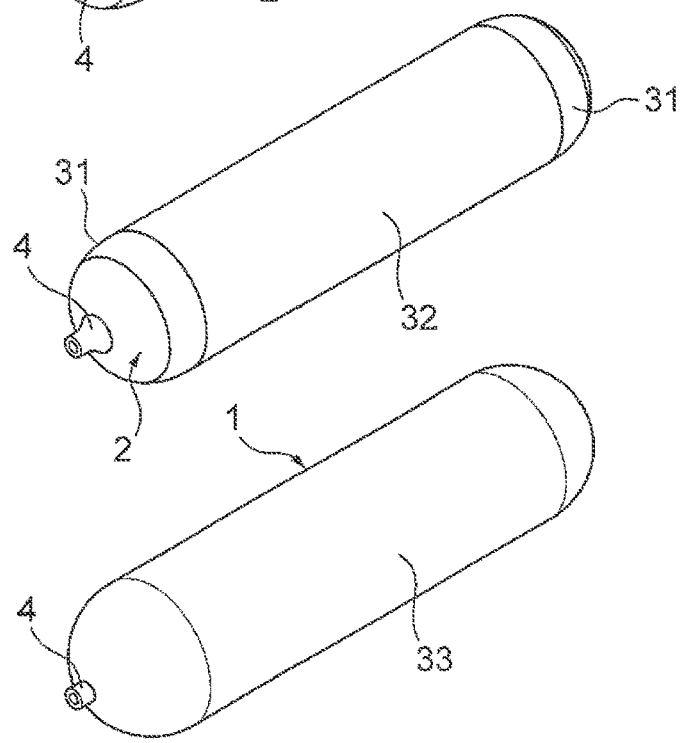

HIGH-PRESSURE TANK AND MANUFACTURING METHOD OF THE SAME

CROSS-REFERENCE TO RELATED APPLICATION

This application claims priority to Japanese Patent Application No. 2021-170107 filed on Oct. 18, 2021, incorporated herein by reference in its entirety.

BACKGROUND

1. Technical Field

The disclosure relates to a high-pressure tank and a manufacturing method of the same.

2. Description of Related Art

There is known a high-pressure tank such as a hydrogen tank or the like that includes a liner having a body that is cylindrical in shape and a pair of dome portions provided at both ends in an axial direction of the body, and a reinforcing layer that is provided on an outer circumferential face of the liner, and that has a hoop layer and a helical layer. A high-pressure tank having such a structure is manufactured by the hoop layer being formed on the outer circumferential face of the body of the liner, using a fiber-reinforced resin in which fibers are impregnated with a resin, following which the helical layer covering the hoop layer and the dome portions is formed (e.g., see Japanese Unexamined Patent Application Publication No. 2014-133304 (JP 2014-133304 A)).

SUMMARY

In the hoop layer, the fibers impregnated with resin are circumferentially oriented at an angle substantially orthogonal to the axial direction of the liner, i.e., oriented in a circumferential direction of the high-pressure tank. On the other hand, in the helical layer, the fibers impregnated with resin are not oriented in the circumferential direction of the high-pressure tank, but are oriented in various directions intersecting the circumferential direction of the high-pressure tank. There is a possibility that delamination will occur at an interface between the hoop layer and the helical layer, in the vicinity of boundary portions between the body and the dome portions, due to orientation directions of the fibers in the hoop layer and the helical layer differing in this way.

The disclosure provides a high-pressure tank in which delamination of the hoop layer and the helical layer in the vicinity of the boundary portions between the body and the dome portions can be suppressed, and a method for manufacturing the same.

A high-pressure tank according to an aspect of the disclosure includes a liner that includes a body that is cylindrical in shape and a pair of dome portions each of which is provided at a respective end of the body in an axial direction, and a reinforcing layer provided on an outer circumferential face of the liner. The reinforcing layer includes a pair of resin members, each of which is provided encircling a respective end portion of an outer circumferential face of the body, a hoop layer that covers part of the outer circumferential face of the body, between the resin members, and a helical layer that covers the resin members, the hoop layer, and the dome portions. The resin members are configured to cover part of the body from boundary portions between the body and the dome portions, and increase in thickness from the boundary portions toward a middle of the body.

In the high-pressure tank according to the disclosure, a structure of the resin members and the helical layer is used in the vicinity of the boundary portions between the body and the dome portions of the liner, instead of the conventional structure of the hoop layer and the helical layer. This does away with the interface made up of fibers having different orientation directions in the vicinity of the boundary portion as in conventional arrangements, and thus delamination of the hoop layer and the helical layer in the vicinity of the boundary portions between the body and dome portions can be suppressed.

In the high-pressure tank according to the above aspect, the resin member may be made of nylon in a ring shape. Nylon has little difference in rigidity from the liner, and accordingly can fill gaps between the liner, the hoop layer, and the helical layer. Moreover, nylon is relatively inexpensive, and accordingly manufacturing costs of the high-pressure tank can be reduced.

In the high-pressure tank according to the above aspect, the helical layer may include curved portions that follow shapes of the dome portions, and the resin members may be disposed from the boundary portions to portions corresponding to curvature ends of the curved portions of the body, in the axial direction of the body. In the conventional structure of the hoop layer and the helical layer, regions from the boundary portions to portions corresponding to the curvature ends of the curved portions of the body are regions in which the thickness of the hoop layer changes. By disposing the resin members in the regions where the thickness changes, the effect of suppressing delamination can be sufficiently ensured, and effects on the strength of the reinforcing layer due to disposing the resin members can be suppressed.

A manufacturing method according to another aspect of the disclosure is a manufacturing method of a high-pressure tank that includes a liner including a body that is cylindrical in shape and a pair of dome portions each of which is provided at a respective end of the body in an axial direction, and a reinforcing layer that is provided on an outer circumferential face of the liner and includes a pair of resin members, a hoop layer, and a helical layer. The manufacturing method includes: a resin member manufacturing step of manufacturing the resin members such that a thickness of the resin members gradually increases from boundary portions between the body and the dome portions toward a middle of the body, in a state in which the resin members are provided encircling an outer circumferential face of the body; a hoop layer forming step of forming the hoop layer on the outer circumferential face of the body, such that part of the outer circumferential face is covered; a resin member disposing step of disposing each of the resin members manufactured in the resin member manufacturing step onto a respective end portion of the hoop layer such that end portions of the resin members that are thickest abut the end portions of the hoop layer formed in the hoop layer forming step; and a helical layer forming step of forming the helical layer that covers the hoop layer, the resin members disposed at respective ends of the hoop layer, and the dome portions.

The manufacturing method according to the disclosure includes a resin member manufacturing step of manufacturing the resin members such that a thickness of the resin members gradually increases from boundary portions between the body and the dome portions toward a middle of the body, a hoop layer forming step of forming the hoop layer on the outer circumferential face of the body, such that part of the outer circumferential face is covered, a resin member disposing step of disposing each of the resin members onto a respective end portion of the hoop layer such that end portions of the resin members that are thickest abut the end portions of the hoop layer, and a helical layer forming step of forming the helical layer that covers the hoop layer, the resin members, and the dome portions. In the high-pressure tank manufactured in this way, there is no interface made up of fibers having different orientation directions in the vicinity of the boundary portions as in conventional arrangements, and accordingly delamination between the hoop layer and the helical layer in the vicinity of the boundary portions between the body and the dome portions can be suppressed.

In the manufacturing method according to the above aspect, the hoop layer forming step may be a step in which the liner is inserted into a hoop layer wound body that is cylindrical in shape and that is manufactured and hardened in advance. Thus, the hoop layer can be easily formed.

According to the disclosure, delamination between the hoop layer and the helical layer, in the vicinity of the boundary portions between the body and the dome portions, can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A is a schematic view illustrating the method of manufacturing the high-pressure tank according to the embodiment;

FIG. 4B is another schematic view illustrating the method of manufacturing the high-pressure tank according to the embodiment;

FIG. 4C is another schematic view illustrating the method of manufacturing the high-pressure tank according to the embodiment; and FIG. 4D is another schematic view illustrating the method of manufacturing the high-pressure tank according to the embodiment.

DETAILED DESCRIPTION OF EMBODIMENTS

An embodiment of a high-pressure tank and a manufacturing method of the same according to the disclosure will be described below with reference to the drawings. In the following description, an example will be described in which the high-pressure tank 1 is installed in a fuel cell electric vehicle and is filled with high-pressure hydrogen gas therein, but the high-pressure tank 1 may be applied to other uses as well. Also, gasses with which the high-pressure tank 1 can be filled are not limited to high-pressure hydrogen gas, and other examples thereof include various types of compressed gases such as compressed natural gas (CNG), various liquefied gases such as liquefied natural gas (LNG) and liquefied petroleum gas (LPG), and other gases.

High-Pressure Tank

Figure 1:
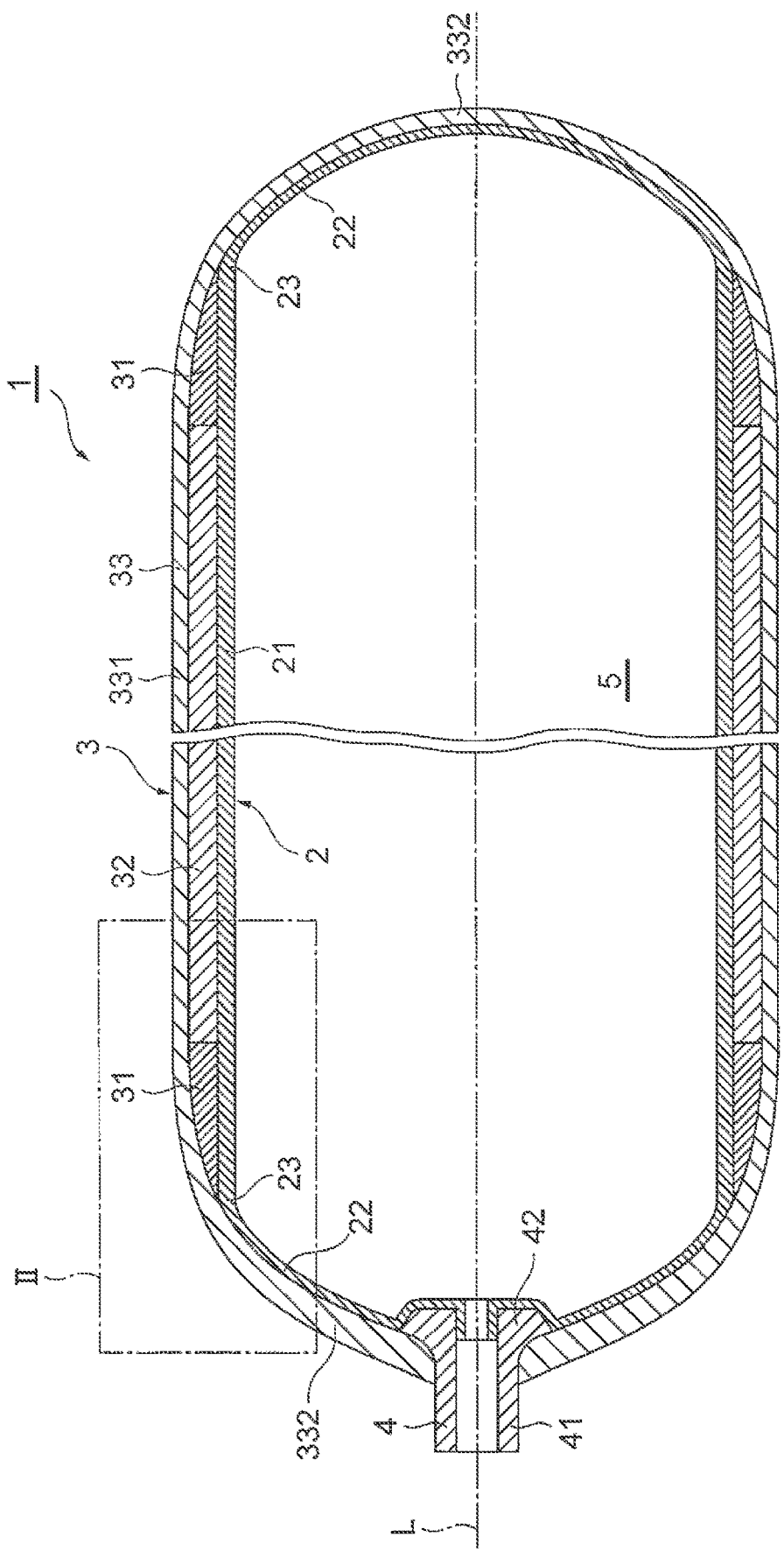
FIG. 1 is a sectional view of a high-pressure tank according to an embodiment.
Figure 2:
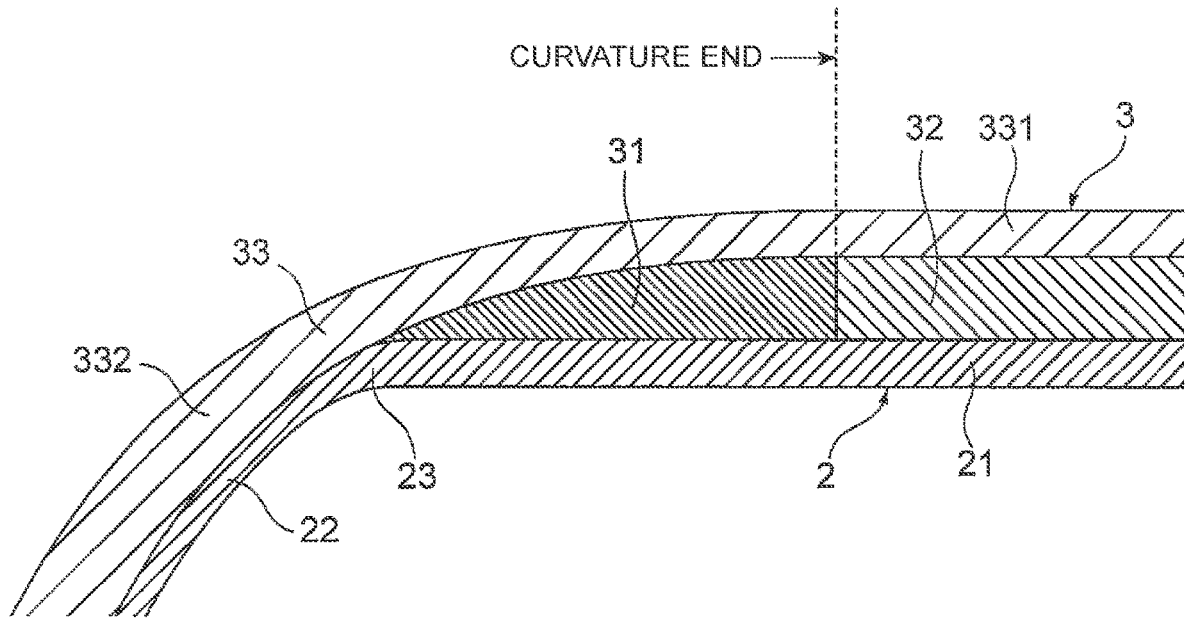
FIG. 2 is an enlarged view of a portion II in FIG. 1.

First, the high-pressure tank will be described with reference to FIGS. 1 and 2. FIG. 1 is a sectional view of the high-pressure tank according to the embodiment, and FIG. 2 is an enlarged view illustrating a portion II in FIG. 1. As illustrated in FIG. 1, the high-pressure tank 1 according to the present embodiment is a high-pressure gas storage container that is substantially cylindrical in shape and is rounded dome-shaped on both ends, and includes a liner 2 that has gas barrier properties, a reinforcing layer 3 that covers an outer face of the liner 2, and a neck 4 attached to one end portion of the high-pressure tank 1.

The liner 2 is a hollow container having a storage space 5 for storing high-pressure hydrogen, and is formed of a resin material or the like having gas barrier properties with respect to hydrogen gas. The liner 2 has a body 21 that is cylindrical in shape, and a pair of dome portions 22, each of the dome portions 22 being provided on a respective right-left side of the body 21 in an axial direction (i.e., a direction of an axis L of the high-pressure tank 1). The body 21 extends over a predetermined length along the direction of the axis L of the high-pressure tank 1. The dome portions 22 are formed continuing from both right and left sides of the body 21, and each has a hemispherical shape of which the diameter decreases the farther away from the body 21.

An opening is formed at a top portion of one dome portion 22 of the dome portions 22 (the dome portion 22 on the left side in FIG. 1), and the aforementioned neck 4 is attached to the opening. No opening is formed in the other dome portion 22.

The liner 2 is formed integrally by rotary blow molding using a resin material such as polyethylene, nylon, or the like, for example. Alternatively, the liner 2 may be formed by coupling a plurality of members obtained separately by injection or extrusion molding, instead of an integral molding manufacturing method such as rotary blow molding. Further, the liner 2 may be made of a metal material such as aluminum, instead of a resin material.

The neck 4 is made by machining a metal material, such as stainless steel, aluminum, or the like, into a predetermined shape. The neck 4 has a neck body 41 that is substantially cylindrical in shape, and a flange portion 42 that is fitted between the liner 2 and the reinforcing layer 3. A valve (omitted from illustration) for filling and discharging hydrogen gas to and from the storage space 5 is attached to the neck 4.

The reinforcing layer 3 is a layer that has a function of improving mechanical strength of the high-pressure tank 1, such as rigidity and pressure resistance, by reinforcing the liner 2. The reinforcing layer 3 includes a pair of resin rings 31 provided encircling respective end portions of an outer circumferential face of the body 21, a hoop layer 32 that is disposed between the resin rings 31 and covers part of the body 21, and a helical layer 33 covering the resin rings 31, the hoop layer 32, and the dome portions 22.

The resin rings 31 correspond to "resin members" described in the claims, and are formed so as to cover part of the body 21 from boundary portions 23 between the body 21 and the dome portions 22. More specifically, the resin rings 31 are disposed from the boundary portions 23 to portions corresponding to curvature ends of curved portions 332 (described later) of the helical layer 33 of the body 21, in the direction of the axis L of the high-pressure tank 1. The thicknesses of the resin rings 31 increase from the boundary portions 23 toward the middle of the body 21.

The resin rings 31 are made of a resin material that has little difference in rigidity as compared to the liner 2. In the present embodiment, the resin rings 31 are preferably made of nylon. Nylon has little difference in rigidity from the liner 2, and accordingly gaps between the liner 2, the hoop layer 32, and the helical layer 33 can be filled when performing thermal curing after forming the helical layer 33 later. Also, nylon is relatively inexpensive, and accordingly manufacturing costs of the high-pressure tank 1 can be reduced. Moreover, nylon does not contain fibers. The resin rings 31 are made of a resin not reinforced by fibers. The term "rigidity" here refers to the coefficient of thermal expansion and the Young's modulus of the liner 2.

The hoop layer 32 is formed so as to cover a portion of the outer circumferential face of the body 21 between the right and left resin rings 31. The hoop layer 32 is formed of fiber-reinforced resin. The fiber-reinforced resin here is obtained by impregnating fibers with a resin, and for example, an article made by bundling monofilaments, several μm or so in diameter, is impregnated with uncured thermosetting resin or thermoplastic resin. Examples of monofilaments include fibers such as glass fiber, carbon fiber, aramid fiber, alumina fiber, boron fiber, steel fiber, polyparaphenylene benzobisoxazole (PBO) fiber, natural fiber, high-strength polyethylene fiber, and so forth, with carbon fiber being preferable for use from the viewpoints of reduced weight, mechanical strength, and so forth.

Examples of the thermosetting resin used for the fiber-reinforced resin include phenol resin, melamine resin, urea resin, epoxy resin, and so forth, with epoxy resin being preferably used from the viewpoint of mechanical strength and so forth. Generally, epoxy resins are resins obtained by mixing a prepolymer that is a copolymer of bisphenol A and epichlorohydrin, or the like, with a curing agent such as polyamine or the like, and thermally curing the resin. Epoxy resins have fluidity in an uncured state and form sturdy cross-linked structures after being thermally cured. On the other hand, examples of thermoplastic resin used for the fiber-reinforced resin include polyether ether ketone, polyphenylene sulfide, polyacrylate ester, polyimide, polyamide, and so forth.

The hoop layer 32 may be formed by, for example, directly performing hoop winding of fibers impregnated with resin on the outer circumferential face of the body 21. Hoop winding is a form in which the fibers are wound in the circumferential direction of the liner 2 so that an angle between an axis of the liner 2 (i.e., the axis L of the high-pressure tank 1) and the winding direction of the fibers (so-called winding angle) is substantially perpendicular. The term "substantially perpendicular" as used here includes both 90° and angles around 90° that may be formed by winding the fibers while shifting the winding position so that fibers do not overlap each other.

Further, the hoop layer 32 may be formed by, for example, fabricating a hoop layer wound body by winding fibers impregnated with resin around an outer circumferential face of a cylindrical mold using hoop winding, hardening the fabricated hoop layer wound body, and thereafter inserting the liner into the hoop layer wound body.

Note that the thickness of the hoop layer 32 is preferably the same as the greatest thickness of the resin rings 31. Thus, when the helical layer 33 is formed on the outside of the resin rings 31 and the hoop layer 32, gaps due to the difference in thickness can be suppressed from being formed.

The helical layer 33 is formed of a fiber-reinforced resin so as to cover the resin rings 31, the hoop layer 32, and the dome portions 22. The fiber-reinforced resin used for the helical layer 33 may be the same as or different from the fiber-reinforced resin used for the hoop layer 32, but is preferably the same from the viewpoint of cost reduction.

The helical layer 33 is formed by, for example, performing helical winding of fibers impregnated with resin so as to cover the resin rings 31, the hoop layer 32, and the dome portions 22. Note that helical winding is a form in which the fibers are spirally wound so that the angle between the axis of the liner 2 and the winding direction of the fiber (winding angle) is greater than 0° and smaller than 90°. This helical winding is further divided into low-angle helical winding and high-angle helical winding, in accordance with the winding angle.

Low-angle helical winding is a helical winding form when the winding angle is small (e.g., greater than 0° and no greater than 30°), and the winding direction of the fibers at the dome portions 22 is reversed before the fibers make a full circle around the axis of the liner 2. High-angle helical winding is a helical winding form when the winding angle is great (for example, greater than 30° and smaller than 90°), and the fibers are wound at least one full circle on the body 21 around the axis of the liner 2, until the winding direction of the fibers at the dome portions 22 is reversed.

The helical layer 33 has a right and left pair of curved portions 332 formed following the forms of the dome portions 22 of the liner 2, and a straight cylinder portion 331 connecting the right and left curved portions 332.

In the high-pressure tank 1 according to the present embodiment, the structure of the resin rings 31 and the helical layer 33 is used in the vicinity of the boundary portions 23 between the body 21 and the dome portions 22, instead of the conventional structure of the hoop layer and the helical layer. This does away with the interface made up of fibers having different orientation directions in the vicinity of the boundary portion as in conventional arrangements, and thus delamination of the hoop layer 32 and the helical layer 33 in the vicinity of the boundary portions 23 can be suppressed. As a result, strain that the fibers of the helical layer 33 are subjected to can be reduced as compared with conventional structures, and fiber wear can be suppressed.

Note that in the present embodiment, the term "vicinity of the boundary portions" does not mean from the boundary portions 23 between the body 21 and the dome portions 22 toward the dome portion 22 sides, but rather partial regions of the body 21 from the boundary portions 23 toward the middle of the body 21.

Also, the resin rings 31 are disposed from the boundary portions 23 to portions corresponding to the curvature ends of the curved portions 332 of the helical layer 33 of the body 21, in the direction of the axis L of the high-pressure tank 1. In the conventional structure of the hoop layer and the helical layer, regions from the boundary portions to portions corresponding to the curvature ends of the curved portions of the body are regions in which the thickness of the hoop layer changes. By disposing the resin rings 31 in the regions where the thickness changes, the effect of suppressing delamination can be sufficiently ensured, and effects on the strength of the reinforcing layer 3 due to disposing the resin rings 31 can be suppressed.

That is to say, when the positions of disposing the resin rings 31 are positions closer to the boundary portion 23 sides than the curvature ends of the curved portions 332, portions are formed in which the thickness of the hoop layers 32 changes, and accordingly there is a possibility that the delamination suppression effects will be insufficient. On the other hand, when the positions of disposing the resin rings 31 exceed the curvature ends of the curved portions (i.e., when these positions are closer to the middle of the body 21), disposing of the resin rings 31 may affect the strength of the reinforcing layer 3. The resin rings 31 are preferably disposed in the regions from the boundary portions 23 to the portions corresponding to the curvature ends of the curved portions 332 of the helical layer 33 in the body 21, taking the above into consideration.

Manufacturing Method of High-Pressure Tank

Figure 3:
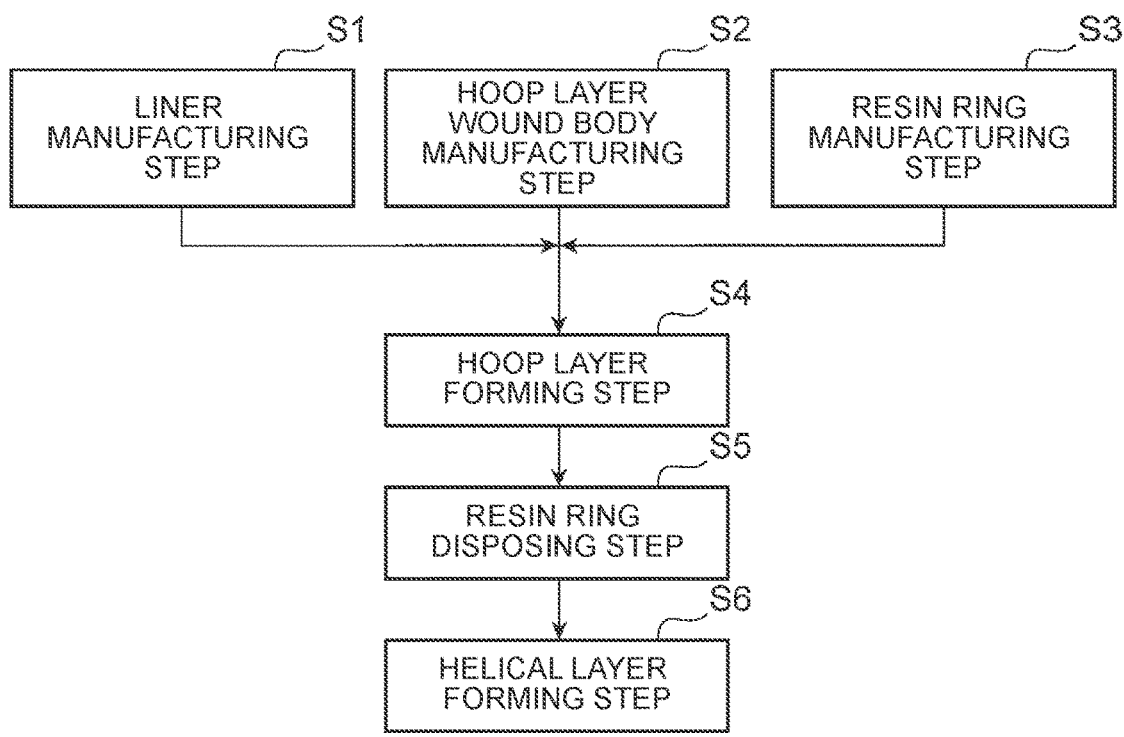
FIG. 3 is a flowchart showing a method of manufacturing the high-pressure tank according to the embodiment.

Next, the manufacturing method of the high-pressure tank 1 according to the present embodiment will be described with reference to FIGS. 3 to 4D. FIG. 3 is a flowchart showing the manufacturing method of the high-pressure tank according to the embodiment, and FIGS. 4A to 4D are schematic views illustrating the manufacturing method of the high-pressure tank according to the embodiment. The manufacturing method of the high-pressure tank 1 includes a liner manufacturing step S1, a hoop layer wound body manufacturing step S2, a resin ring manufacturing step S3, a hoop layer forming step S4, a resin ring disposing step S5, and a helical layer forming step S6. Note that the liner manufacturing step S1, the hoop layer wound body manufacturing step S2, and the resin ring manufacturing step S3 are steps that are independent from each other, and accordingly may be performed in parallel, and any of these steps may be performed first.

In the liner manufacturing step S1, the liner 2 having the body 21 that is cylindrical in shape, and the dome portions 22 provided at both ends of the body 21 in the axial direction, is manufactured. Specifically, first, the liner 2 is integrally formed by rotary blow molding, using a resin member such as polyethylene, nylon, or the like. Next, the neck 4 is attached to one end portion of the formed liner 2 (see FIG. 4A).

In the hoop layer wound body manufacturing step S2, first, a sheet made of fiber-reinforced resin is wound around the outer circumferential face of a drum-shaped mandrel, so that the fibers are oriented in the circumferential direction of the mandrel, thereby forming a hoop layer wound body 30 that is cylindrical in shape and that is an intermediate form of the hoop layer 32. Next, the hoop layer wound body 30 that has been formed is removed from the mandrel and hardened (see FIG. 4A).

The method for hardening the hoop layer wound body 30 (in other words, hardening the resin with which the fibers are impregnated) is not limited in particular, but when the resin used for impregnating is a thermosetting resin, the resin may be pre-cured. Pre-curing conditions (temperature and time) vary depending on the type of resin used for impregnating, but viscosity of the resin is set to be higher than viscosity when wound on a predetermined mold (viscosity before pre-curing). Here, pre-curing is performed until the resin used for impregnating loses its fluidity. On the other hand, when the resin used for impregnating is a thermoplastic resin, the resin may be hardened by cooling the fibers in a state in which the resin has fluidity.

Further, in this hoop layer wound body manufacturing step S2, the hoop layer wound body 30 may be formed by a centrifugal winding (CW) method, in which a fiber sheet impregnated with resin is attached to an inner face of a rotating cylindrical mold. The fiber sheet used at that time has fibers oriented in the circumferential direction of the cylindrical mold, for example.

In the resin ring manufacturing step S3, the resin rings 31 are manufactured by injection molding using nylon, such that the thickness thereof gradually increases from the boundary portions 23 between the body 21 and the dome portions 22 toward the middle of the body 21, in a state in which the manufactured resin rings 31 are provided encircling the outer circumferential face of the body 21 of the liner 2 later (see FIG. 4A).

In the hoop layer forming step S4, the liner 2 manufactured in the liner manufacturing step S1 is inserted into the hoop layer wound body 30 manufactured and hardened in the hoop layer wound body manufacturing step S2, thereby forming the hoop layer 32 (see FIG. 4B).

In the resin ring disposing step S5, the resin rings 31 manufactured in the resin ring manufacturing step S3 are disposed at both end portions of the hoop layer 32 formed in the hoop layer forming step S4. At this time, the resin rings 31 are fitted onto the outer circumferential face of the body 21, so that the thickest end portions of the resin rings 31 abut the end portions of the hoop layer 32 (see FIGS. 4B and 4C). Further, the end portions of the resin rings 31 and the end portions of the hoop layer 32 are preferably fixed with an adhesive, in order to suppress deviation of the positions of the resin rings 31.

In the helical layer forming step S6, a helical layer is formed that covers the hoop layer 32, the resin rings 31 disposed at both ends of the hoop layer 32, and the dome portions 22 of the liner 2. Specifically, first, fibers impregnated with resin are wound by helical winding so as to cover the entire hoop layer 32, the resin rings 31, and the dome portions 22 thereby forming a wound body for the helical layer. Next, the liner 2 on which the wound body for the helical layer, the hoop layer 32, and the resin rings 31 are formed is transported into a thermosetting furnace, and the fiber impregnated with the resin is thermally cured by heating in the thermosetting furnace at 160° C. for 10 minutes, for example. Thus, the high-pressure tank 1 is manufactured.

In the high-pressure tank 1 manufactured by the above manufacturing method, there is no interface made up of fibers having different orientation directions in the vicinity of the boundary portions as in conventional arrangements, and accordingly delamination between the hoop layer 32 and the helical layer 33 in the vicinity of the boundary portions 23 between the body 21 and the dome portions 22 can be suppressed.

Although the embodiment of the disclosure has been described in detail above, the disclosure is not limited to the embodiment described above, and various design changes can be made without departing from the spirit of the disclosure described in the claims.

For example, in the above embodiment, the resin members have been described as being resin rings, but in addition to resin rings, C-shaped resin members or a combination of a plurality of arc-shaped resin members may be used, for example.

What is claimed is:
1. A high-pressure tank, comprising:
 a liner that includes a body that is cylindrical in shape and a pair of dome portions each of which is provided at a respective end of the body in an axial direction; and
 a reinforcing layer provided on an outer circumferential face of the liner, wherein:
 the reinforcing layer includes
  a pair of resin members, each of which is provided encircling a respective end portion of an outer circumferential face of the body,
  a hoop layer that covers part of the outer circumferential face of the body, between the resin members, and
  a helical layer that covers the resin members, the hoop layer, and the dome portions; and wherein:

the resin members are configured to cover part of the body from boundary portions between the body and the dome portions, and increase in thickness from the boundary portions toward a middle of the body, the thickness of the hoop layer is the same as the greatest thickness of the resin members, and the resin members are made of a different resin material from the hoop layer.

2. The high-pressure tank according to claim 1, wherein the resin members are made of nylon in a ring shape.

3. The high-pressure tank according to claim 1, wherein the helical layer includes curved portions that follow shapes of the dome portions, and the resin members are disposed from the boundary portions to portions corresponding to curvature ends of the body, in the axial direction of the body.

4. The high-pressure tank according to claim 1, wherein the end portions of the resin members and the end portions of the hoop layer are fixed with an adhesive.

5. The high-pressure tank according to claim 1, wherein a rigidity difference between the resin members and the liner is smaller than a rigidity difference between the hoop layer and the liner.

\* \* \* \* \*